United States Patent
Seo et al.

(10) Patent No.: US 11,641,495 B2
(45) Date of Patent: May 2, 2023

(54) USE OF VIDEO FRAME FORMAT AS BASIS FOR DIFFERENTIAL HANDLING OF AUTOMATIC CONTENT RECOGNITION AND ASSOCIATED ACTION

(71) Applicant: Roku, Inc., San Jose, CA (US)

(72) Inventors: Chung Won Seo, Seoul (KR); Shashank C. Merchant, Sunnyvale, CA (US); Yong-joo Hong, Seoul (KR); Yoan Magniez, Seoul (KR)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 17/208,283

(22) Filed: Mar. 22, 2021

(65) Prior Publication Data
US 2022/0182692 A1 Jun. 9, 2022

Related U.S. Application Data

(60) Provisional application No. 63/199,110, filed on Dec. 7, 2020.

(51) Int. Cl.
*H04N 21/234* (2011.01)
*H04N 21/2343* (2011.01)
*H04N 21/81* (2011.01)

(52) U.S. Cl.
CPC ........... *H04N 21/23424* (2013.01); *H04N 21/23418* (2013.01); *H04N 21/23439* (2013.01); *H04N 21/812* (2013.01)

(58) Field of Classification Search
CPC .............................. H04N 21/23424
See application file for complete search history.

(56) References Cited

U.S. PATENT DOCUMENTS

| | | | |
|---|---|---|---|
| 2011/0191798 A1* | 8/2011 | Bassali | H04N 7/10 725/32 |
| 2015/0125036 A1* | 5/2015 | Bilobrov | G06V 10/40 382/103 |
| 2017/0272814 A1* | 9/2017 | Chen | H04N 21/812 |

\* cited by examiner

*Primary Examiner* — Michael H Hong
(74) *Attorney, Agent, or Firm* — Sterne, Kessler, Goldstein & Fox P.L.L.C.

(57) ABSTRACT

A computing system that identifies a media stream that a media client is processing for presentation determines which frame format of the media stream the media client is processing for presentation. And the computing system uses that determined frame format as a basis to facilitate dynamic content modification. For instance, based on then determined frame format, the computing system could work to ensure that replacement or overlay content that the media client obtains to facilitate dynamic content modification of the media stream is of that determined frame format. Further or alternatively, based on the determined frame format, the computing system could work to ensure that the media client gets provisioned with reference fingerprints of that particular frame format of the media stream, for use to facilitate client-side fingerprint matching to confirm that the media stream continues to be identified media stream.

22 Claims, 5 Drawing Sheets

USE OF VIDEO FRAME FORMAT AS BASIS FOR DIFFERENTIAL HANDLING OF AUTOMATIC CONTENT RECOGNITION AND ASSOCIATED ACTION

REFERENCE TO RELATED APPLICATION

This application claims priority to U.S. Provisional Patent Application No. 63/199,110, filed Dec. 7, 2020, the entirety of which is hereby incorporated by reference.

BACKGROUND

A typical media client operates to receive an analog or digital media stream representing video content and to process the media stream to facilitate presentation of the video content on a user interface such as a display screen. Examples of such clients include televisions, computer monitors, projection systems, set top boxes (e.g. cable or satellite TV receivers), digital video recorders, mobile communication devices, gaming consoles, audio/video receivers, and streaming media receivers/players, among others.

Further, the processing of the media stream for presentation could take various forms, examples of which include, without limitation, transcoding or otherwise manipulating content of the media stream to put the content in a form suitable to facilitate presentation, and outputting content of the media stream to a user interface and/or to another device for presentation.

By way of example, a television could receive a broadcast stream (e.g., over the air, from a set top box, through an Internet connection, or in another manner) and could engage in processing to present the video content of that broadcast stream on a display screen of the television. As another example, a set top box could receive a packetized transport stream carrying video content of a television channel provided by a multi-channel video program distributor (MVPD) and could de-packetize and output the video content of that stream via a High-Definition Multimedia Interface (HDMI) cable or other interface to a television and/or audio/video receiver for playout. And as yet another example, a streaming media receiver could receive a media stream over an Internet connection from a streaming-content service provider (such as a virtual-MVPD) and could likewise output the video content of that stream via an HDMI or interface to a television or other device for playout. Other examples are possible as well.

SUMMARY

As a media client receives and processes a media stream for presentation, it may be useful in certain situations for the media client to take special action with respect to the media stream. For instance, it may be useful for the media client to dynamically modify a portion of the stream's content, such as to replace an ad or other portion of the media stream with a replacement ad or other replacement content, or to supplement a portion of the content with overlay content, such as with channel identification, context information, ad content, interactive content, or the like.

Further, it may be desirable for the media client to perform such content modification at a specific time point within the media stream. For instance, if the media client is to dynamically replace an existing ad with a replacement ad, it may be desirable for the media client to position the replacement ad at a particular time in the media stream when the existing ad would have started. Likewise, if the client is to supplement a specific portion of the media content with an overlay possibly related to that portion, it may be desirable for the client to start the overlay when that portion starts. Other examples are possible as well.

More particularly, the media stream at issue could define a sequence of video frames, and it may be desirable for the media client to perform the content modification on a frame-accurate basis. For instance, for dynamic advertisement insertion (DAI), it may be desirable for the media client to insert a replacement ad in place of an existing ad starting precisely at the first frame of the existing ad. And for adding an overlay to a specific portion of the media stream, it may be desirable for the media client to start the overlay at or in specific time relation to the first frame of that portion of the media stream.

To facilitate having the media client take this or other such action at a desired time point within a media stream that the media client is receiving and processing for presentation, the media client could interact with one or more servers or other entities external to the media client, which could assist in (i) identifying the media stream that the media client is processing for presentation and (ii) enabling the media client to carry out a desired content revision at a desired time point within that media stream. Further, this interaction could occur through a channel of communication separate from the channel that carries the media stream and, taking advantage of a delay that may exist in distribution of the media stream to the media client, could facilitate advanced preparation for content modification in an upcoming portion of the media stream.

For this or other purposes, for instance, the media client could engage in signaling with an automatic content recognition (ACR) server, which could engage in a process to identify the media stream that the media client is processing for presentation. This media-stream identification process could take any of a variety of forms. Without limitation, for instance, the process could make use of digital fingerprinting technology, applying fingerprint-based ACR.

With fingerprint-based ACR, the ACR server could be provisioned with reference data that includes reference video fingerprints respectively representing video frames of each of various known media streams that could be presented by the media client, such as with reference fingerprints generated in real time respectively for each of various broadcast streams or other linear media streams to which the media client could tune. And as the media client processes a given media stream for presentation, the media client could correspondingly generate query video fingerprints representing video frames of the media stream that the media client is processing and could transmit those query video fingerprints to the ACR server for analysis.

As the ACR server receives these query fingerprints from the media client, the ACR server could search through the reference data in an effort to find reference fingerprints that match the received query fingerprints. And upon finding with sufficient confidence that the query fingerprints match the reference fingerprints representing a particular known media stream, the ACR server could thereby determine that the media stream being processed for presentation by the media client is that known media stream.

Having determined in this or another manner the identity of the media stream that the media client is processing for presentation, the ACR server could then work with the media client to facilitate dynamic content modification at a particular time point in that media stream.

To facilitate the dynamic content modification at the particular time point in the media stream, the ACR server could first determine that time point, perhaps as a particular video frame where the content modification is to start. For instance, the ACR server could be pre-provisioned with an indication of the time point, or the ACR server could use fingerprint-based ACR as a basis to determine the time point.

Once the ACR server has determined the time point in the media stream at which the media client should carry out a dynamic content modification, the ACR server could then direct and thus cause the media client to carry out a dynamic content modification (e.g., content replacement) at that determined time point. To facilitate this, for instance, the ACR server could transmit to the media client various information about the content modification to perform. For instance, the ACR server could provide the media client with an indication of the time point at which the media client should carry out the content modification as well as other information such as a type of content modification to carry out and a duration of that content modification.

In response to this content-modification information, the media client could then prepare for and carry out the indicated content modification. In some implementations, for instance, the media client could responsively query a content-management server to obtain suitable replacement or overlay content, and the media client could then present that replacement or overlay content at the indicated time point. For instance, for DAI, the media client could obtain from the content-management server a video Uniform Resource Locator (URL) of a replacement ad of a suitable duration, and the media client could then obtain the replacement ad from that video URL and could present the obtained replacement ad in place of an existing ad of the media stream that the media client is processing for presentation.

In addition, to help ensure that the media stream being processed for presentation by the media client continues to be the identified media stream leading up to and during this dynamic content modification process, or for other purposes, the ACR server could also supply the media client with reference fingerprints of the identified media stream, and the media client could conduct client-side fingerprint-matching.

For instance, given the identification of the media stream, the ACR server could transmit to the media client sets of reference fingerprints that represent upcoming video frames of that media stream, i.e., video frames that would soon be received by the media client. Further, the media client could continue to generate query fingerprints of the media stream that the media client is receiving. And the media client could compare those query fingerprints with the reference fingerprints to determine if they match, as a condition for the media client proceeding with the dynamic content modification.

Namely, if the media client thereby confirms that the query fingerprints match the reference fingerprints with sufficient confidence, then the process could continue. Whereas, if the media client thereby determines that the query fingerprints do not match the reference fingerprints with sufficient confidence, that could mean that the media client has switched to receive a different media stream (e.g., changed channels), and so the media client could responsively abandon the content modification process and perhaps notify the ACR server or take other action.

One technical issue that can arise in connection with various stages of the processing discussed above or in other contexts is that the media stream that the media client is processing for presentation may have a particular frame format that needs special treatment.

In modern video presentation systems where video content is presented on a display screen with a 16:9 aspect ratio, by way of example, numerous different video frame formats exist. Without limitation, three examples of such frame formats are: (i) "normal", or where the video content has an aspect ratio of 16:9 that fills the 16:9 display screen, (ii) "wide", where the video content has an aspect ratio of about 2.39:1 and is therefore letter-boxed with black bars at the top and bottom on the 16:9 display screen, and (iii) "crop", where the video content has an aspect ratio of 4:3 and is therefore pillar-boxed with black bars at the left and right sides on the 16:9 display screen. Other examples are possible as well.

In practice, a given media stream might be provided for presentation in multiple different frame formats such as these or others. And the media client might therefore be outputting the media stream for presentation in any such frame format.

The frame format of the media client's output could depend on various factors.

By way of example, the frame format could depend on a frame-format setting of the media client. For instance, the media client might have "normal", "wide", and "crop" presentation setting options, and which of these options is selected could govern the frame format of the media client's output, possibly regardless of the frame format of the media stream being received by the media client.

In this case, if the media client is receiving a "normal" format media stream and the media client is set to output the media stream in "normal" format, then the media client would output the media stream with the received aspect ratio. Whereas, if the media client is receiving a "normal" format media stream and the media client is set to output the media stream in "wide" format, then the media client may insert black bars at the top and bottom of each output video frame, possibly squeezing the video content vertically or possibly overlaying the black bars at the top and bottom portions of each frame. And if the media client is receiving a "normal" format media stream and the media client is set to output the media stream in "crop" format, then the media client may insert black bars at the left and right of each output video frame, possibly squeezing the video content horizontally or possibly overlaying the black bars at the left and right portions of each frame.

Alternatively or additionally, the frame format of the of the media client's output could depend on the frame format of the media stream as received by the media client. Here, for instance, a given media stream might be available for receipt in each of multiple different frame formats such as those noted above. By way of example, one TV channel might provide a given video program in "normal" format, while another TV channel might provide the same video program in "wide" format," and yet another TV channel might provide the same video program in "crop" format. And the media client might be receiving and processing for presentation any given one of these versions of the media stream.

The possibility that the media client could be presenting a given media stream in any of various different frame formats could raise issues in the processing discussed above.

For example, when the ACR server identifies the media stream being processed for presentation by the media client, the ACR server may generally identify that media stream and may then supply the media client with reference fingerprints that represent a first frame format of the media stream, such as the "normal" frame format, to facilitate client-side fingerprint matching as discussed above. But if the media client is processing the media stream for presentation in a second, different frame format, such as the "wide"

or "crop" format for instance, then media client's client-side fingerprint-matching may fail. Namely, because of the difference in frame formats, the media client may determine that the media client's query fingerprints representing frames of the media stream that the media client is processing for presentation in the second frame format do not match the reference fingerprints representing the identified media stream in the first frame format. This failure of fingerprint matching could therefore result in failure of the dynamic content modification process.

As another example, when the media client prepares to carry out a dynamic content modification of a generally-identified media stream without regard to the frame format that the media client is processing for presentation, the media client might obtain for presentation a replacement or overlay content segment that has the wrong frame format. For instance, if the media client is presenting a media stream in the "crop" format and the ACR generally identifies that media stream and directs the media client to perform DAI, the media client may request and obtain a replacement ad from the content-management server, but that replacement ad might be in the "normal" format. As a result, when the media client outputs the replacement ad for presentation, the output video frame format would be different than the frame format of the preceding video content, which could create a poor user experience.

The present disclosure provides a technical mechanism that may help to address these and other such issues.

In accordance with the disclosure, a computing system that identifies a media stream that a media client is processing for presentation will determine which frame format of the media stream the media client is processing for presentation. And the computing system will use that determined frame format as a basis to facilitate dynamic content modification. For instance, based on then determined frame format, the computing system could work to ensure that replacement or overlay content that the media client obtains to facilitate dynamic content modification of the media stream is of that determined frame format, i.e., of a frame format that matches the frame format of the media stream that the media client is processing for presentation. Further or alternatively, based on the determined frame format, the computing system could work to ensure that the media client gets provisioned with reference fingerprints of that particular frame format of the media stream, to help ensure that the media client can successfully engage in client-side fingerprint matching.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

The present disclosure will discuss example implementation in connection with media clients such as televisions or the like. It will be understood, however, that various principles disclosed could extend to apply with respect to other types of media clients, such as set top boxes or other receivers, or mobile phones, among other possibilities. Further, it will be understood that various arrangements and processes described herein can take various other forms. For instance, elements and operations can be re-ordered, distributed, replicated, combined, omitted, added, or otherwise modified. And it will be understood that functions described herein as being carried out by one or more entities could be implemented by and/or on behalf of those entities, through hardware, firmware, and/or software, such as by one or more processing units executing program instructions or the like.

Figure 1:
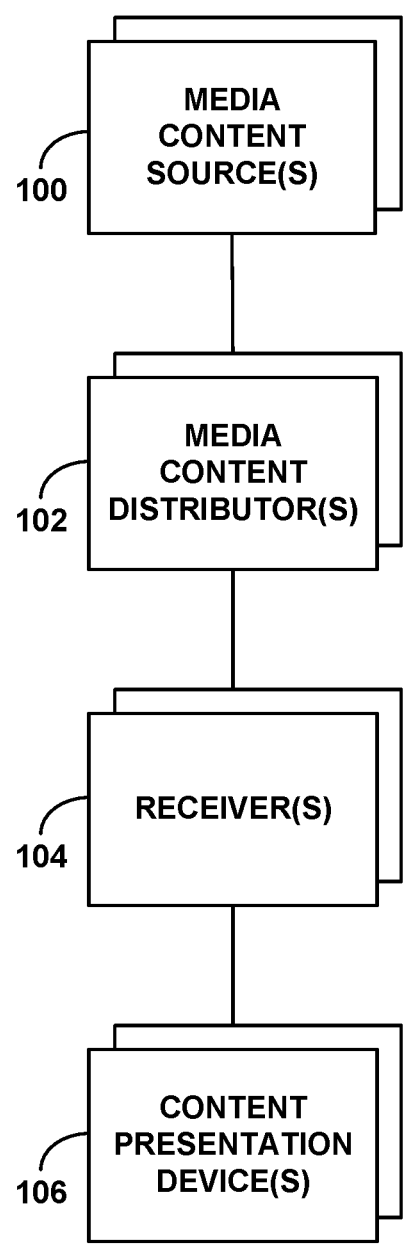
FIG. 1 is a simplified block diagram of an example system in which various disclosed principles can be applied.

Referring to the drawings, as noted above, FIG. 1 is a simplified block diagram of an example system in which various disclosed principles can be applied. As shown in FIG. 1, the example system includes one or more media content sources 100 (e.g., broadcasters, web servers, other content providers, etc.), one or more media content distributors 102 (e.g., multi-channel distributors, such as cable providers, satellite providers, over-the-air broadcast providers, web aggregators, virtual-MVPDs, etc.), one or more media content receivers 104 (e.g., cable receivers, satellite receivers, over-the-air broadcast receivers, computers or other streaming media receivers, etc.), and one or more content presentation devices 106 (e.g., televisions or other display devices, etc.)

With this or other arrangements, the content sources 100 could deliver media content to the content distributors 102 for distribution to receivers 104 at customer premises, and the content distributors could distribute the media content to the receivers 104 as media streams, such as particular channels of content (e.g., particular frequencies, particular streaming media sessions, or other defined channels). Each receiver 104 could then respond to user input or one or more other triggers by tuning to or otherwise starting to receive a selected media stream and outputting the media stream to one or more content presentation devices 106. And each content presentation device 106 could thus receive and process the media stream for presentation, such as rendering content of the media stream for presentation on a display screen, among other possibilities.

Without limitation, for instance, each content presentation device 106 could be a television situated at customer premises, which could be coupled by an HDMI cable with a cable-TV set top box or streaming-media receiver, and the set top box or streaming-media receiver could be coupled through a network with a cable-TV head end or virtual-MVPD that distributes various broadcast channels or streaming media channels. In this arrangement, the television could receive a media stream via HDMI from the set top box or streaming-media receiver, and the set top box or streaming-media receiver could tune to a particular channel in response to user input, so that the media stream arriving at the television would then represent the user-selected channel. Other examples are possible as well.

Figure 2:
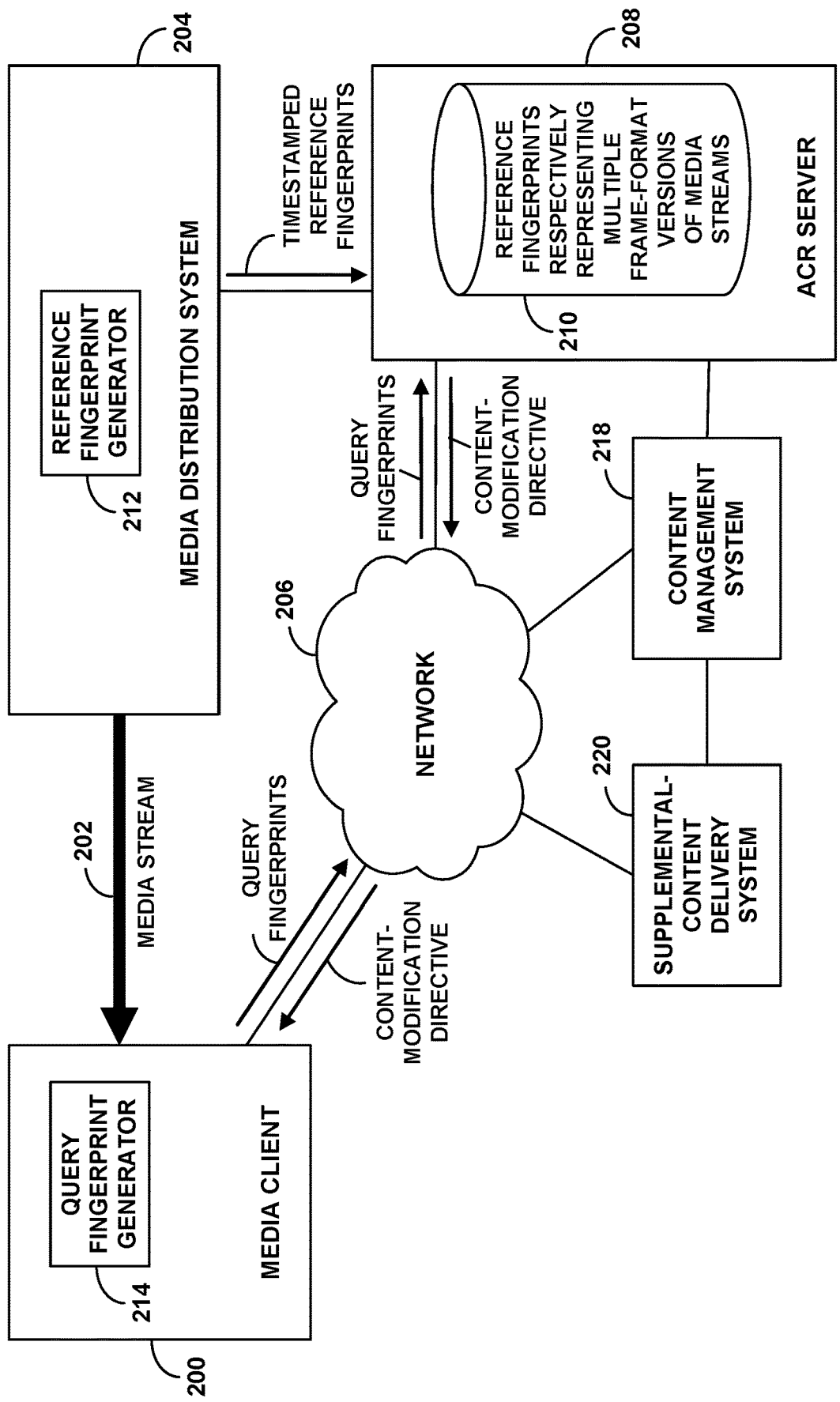
FIG. 2 is another simplified block diagram of an example system in which various disclosed principles can be applied.

FIG. 2 next illustrates an example system arranged to facilitate implementation of some of the presently disclosed features, particularly to facilitate frame-format based handling of dynamic content modification.

FIG. 2 shows at its top a representative media client 200 receiving a media stream 202 being provided by a media distribution system 204. By way of example, the media client 200 could be an example content presentation device 100 as shown in FIG. 1, and the media distribution system 204 could comprise any system that outputs, delivers, or otherwise provides media streams, perhaps a media content source 100 and/or media content distributor 102 of FIG. 1, among other possibilities.

The media client 200 could be receiving the media stream 202 directly or indirectly from the media distribution system 204. Further, the media stream might be a linear broadcast feed and/or a streaming media channel, among other possibilities, and the media client 200 might be receiving the media stream through any of a variety of distribution channels, such as but not limited to cable, satellite, terrestrial over-the-air broadcast, broadband Internet, or others now known or later developed.

As discussed above, the media stream could define a sequence of digital video frames that the media client 200 is configured to process for presentation on a display. For instance, a media content source, media content distributor, and/or other entity might be broadcasting, streaming, or otherwise providing this sequence of frames encapsulated in a packet-based transport stream for receipt by a receiver, and the receiver may be extracting the sequence of frames from the transport stream and outputting the sequence of frames for processing by the media client 200.

Further, the media stream being processed for presentation by the media client 200 could have a particular frame format. For instance, the media stream could have one of the three frame formats noted above, namely, normal, wide, or crop. Other examples are possible as well.

As further shown in FIG. 2, the media client 200 is interconnected with a communication network 206, which could be a packet-switched network such as the Internet, among other possibilities. For instance, the media client 200 may sit as a node on a local area network (LAN) at customer premises, with the media client 200 having an assigned Internet Protocol (IP) address on the LAN and the LAN having an IP address on the network 206. The media client 200 could thus engage in data communication with various entities via the network 206 while the media client 200 is receiving and processing the media stream 202 for presentation.

Shown accessible via the network 206 (e.g., at a defined IP address on the network) is an ACR server 208, which could operate to identify the media stream that the media client 200 is processing for presentation and to coordinate having the media client 200 engage in dynamic content modification of the media stream.

In line with the discussion above, the ACR server 208 and media client 200 could cooperatively engage in fingerprint-based ACR to identify the media stream being received and processed by the media client 200.

With fingerprint-based ACR, as noted above, the ACR server 208 could be provisioned with or otherwise have access to reference data that includes digital reference fingerprints 210 respectively representing each of various known media streams and that maps the reference fingerprints to the respective media streams that they represent.

In an example implementation, the media distribution system 204 that distributes each of one or more known media streams could regularly provision the ACR server 208 with this reference fingerprint data. For instance, for each of one or more media streams that the media distribution system 204 is distributing, a reference-fingerprint generator 212 (e.g., program instructions executable by a processor of the media distribution system 204) could generate reference fingerprints on a per-frame basis or other ongoing basis and could establish for each such reference fingerprint an associated reference timestamp indicating the time at which the media distribution system 204 processed the frame. Further, the media distribution system 204 could regularly transmit these generated reference fingerprints to the ACR server 208, specifying for each reference fingerprint the associated reference timestamp and an identity of the media stream whose frame the reference fingerprint represents. And as the ACR server 208 receives this data, the ACR server could store the data in a relational database or other form suitable for ready searching and access.

An example digital fingerprinting process as to video content could apply on a per video frame basis and could involve establishing a representation of luminosity and/or other video characteristics. For instance, for a given video frame, the fingerprint generator 212 could programmatically divide the frame into a grid, and the fingerprint generator could measure luminosity of the frame per grid cell and generate a bit string with each bit or series of bits representing luminosity of a respective grid cell, or representing a weighted difference between the luminosity of certain defined pairs of the grid cells, or the like. Further, the fingerprint generator 212 could apply this process continually to generate the digital fingerprint over time as a sequence of fingerprints (e.g., as a fingerprint stream). For instance, the fingerprint generator could apply this process to each frame, to each key frame, periodically, or on another defined basis, with each frame's bit string defining a digital fingerprint and/or with a specified hash, combination, or series of such bit strings or other representative values defining a digital fingerprint, on a sliding window basis. Other digital fingerprinting processes could be used as well.

For present purposes, the reference fingerprint data 210 accessible by the ACR server 208 could include reference fingerprint data for multiple different frame-format versions of each of one or more media streams, including the media stream 202 being received and processed by the media client 200. And the reference fingerprint data 210 could correlate the various reference fingerprints with both media stream identity and media stream frame format.

For instance, for a given media stream such as media stream 202 being received and processed by the media client 200, the reference fingerprint data 210 could include reference fingerprints of a "normal" frame format version of the media stream, reference fingerprints of a "wide" frame format version of the media stream, and reference fingerprints of a "crop" frame format version of the media stream. And the reference fingerprint data 210 could map each reference fingerprint with a general identity of the media stream and with the frame format of the frame represented by the reference fingerprint.

The ACR server 208 could become provisioned with this data in various ways.

For example, for each of various media streams distributed by the media distribution system 204, including the media stream 202 being received and processed by the media client 200, the reference-fingerprint generator 212 could receive a "normal" format copy of the media stream and, based on that frame-format version of the media stream, could generate and provide for receipt by the ACR server 208 reference fingerprints representing each of various different frame format versions of the media stream.

For instance, the fingerprint generator 212 could generate and provide reference fingerprints representing the "normal"

frame-format version of the media stream, along with metadata indicating the media stream identity and the "normal" frame format. Further, the fingerprint generator 212 could programmatically convert the "normal" frame-format version of the media stream into a "wide" frame format version of the media stream and could generate and provide reference fingerprints representing that "wide" frame-format version of the media stream, along with metadata indicating the media stream identity and the "wide" frame format. And the fingerprint generator 212 could also programmatically convert the "normal" frame-format version of the media stream into a "crop" frame format version of the media stream and could generate and provide reference fingerprints representing that "crop" frame-format version of the media stream, along with metadata indicating the media stream identity and the "crop" frame format. The ACR server 208 could thus receive this reference fingerprint data and store it for access.

As another example, the reference-fingerprint generator 212 could receive multiple different frame-format versions of the media stream, such as versions being broadcast on different TV channels with different such frame formats, and could generate and provide fingerprints respectively representing video frames of each of those versions. Thus, for each frame-format version of the media stream, the fingerprint generator 212 could generate and provide reference fingerprints representing the frames of that frame-format version of the media stream, along with metadata indicating the media stream identity and the frame-format version. And the ACR server 208 could likewise receive this reference fingerprint data and store it for access.

In addition, as the media client 200 receives and processes the media stream 202, the media client 200 could generate the query fingerprints of the media content on a pre-frame basis or other ongoing basis and could regularly transmit the generated query fingerprints to the ACR server 208 for analysis.

To facilitate this, the media client 200 in an example implementation could be equipped with a query-fingerprint generator 214 (e.g., program instructions executable by a processor of the media client 200), configured to generate query fingerprints representing the media stream 202 that the media client 200 is currently processing. The query-fingerprint generator 214 could be configured to receive as input a copy of the media stream 202 as the media stream 202 arrives at the media client 200 and/or is otherwise processed for presentation by the media client 200, and the fingerprint generator 214 could be configured to generate the query fingerprints of the media content on a per frame basis or other ongoing basis, using the same digital fingerprinting process used to generate the reference fingerprints, to facilitate a comparison of the query fingerprints with the reference fingerprints.

Further, the media client 200 could transmit these generated query fingerprints via network 206 to the ACR server 208 for analysis, to enable the ACR server 208 to engage in fingerprint matching and coordination of dynamic content modification. By way of example, the media client 200 could periodically or otherwise from time to time transmit to the IP address of the ACR server 208 the query fingerprints representing a latest series of frames of the channel being processed by the media client 200.

On an ongoing basis or in response to one or more triggers, as the ACR server 208 receives these query fingerprints from the media client 200, the ACR server 208 could compare the query fingerprints with the reference fingerprints 210 in an effort to find a match.

To compare a given query fingerprint with a given reference fingerprint, the ACR server 208 could compare corresponding portions of the fingerprints with each other to determine whether the portions match exactly or within defined tolerances. For example, the ACR server 208 could compute a maximum deviation between the fingerprints and determine if the maximum deviation is within a predefined tolerance. Further, if the fingerprints are binary, this could be a Boolean determination or could involve computing a Hamming distance (as a count of mismatches between respective bit locations in the fingerprints), and if the fingerprints are more complex values, such as decimal values or vectors (e.g., grey values per video frame region), this could involve determining a distance between the values or vectors. Numerous other examples are possible as well.

Upon finding with sufficient certainty that the query fingerprints match particular reference fingerprints, the ACR server 208 could determine not only the identity of the media stream being processed by the media client 200 but also the frame format of that media stream. For instance, based on the metadata associated with the various matching reference fingerprints, the ACR server 208 could determine both the identity of the media stream whose frames the reference fingerprints match but also the frame format of those frames and thus of the media stream. And based on the matching, the ACR server 208 could conclude that the that is the identity and frame format of the media stream being processed by the media client 200.

This process of determining the frame format of the media stream being processed by the media client 200 could involve finding with a sufficiently high confidence level that the query fingerprints provided by the media client 200 match the reference fingerprints representing that particular frame format of a known media stream and perhaps further determining with a sufficiently high confidence level that the query fingerprints do not match the reference fingerprints representing one or more other frame formats of the known media stream.

Further, this process can involve the ACR server 208 determining how closely the query fingerprints match respectively each of the different frame-format version sets of reference fingerprints and selecting as the correct frame-format the version with the closest determined match. For instance, if the ACR server 208 finds that the query fingerprints match the reference fingerprints representing the "normal" frame-format version of a media stream, the reference fingerprints representing the "wide" frame-format version of that media stream, and the "crop" frame-format version of that media stream, the ACR server 208 may assign to each frame-format version a respective matching score indicating how closely the query fingerprints match the reference fingerprints representing that frame-format version. And the ACR server 208 could then select as the correct frame-format version the version with the highest such assigned matching score.

Once the ACR server 208 has determined in this or another manner the media stream that the media client 200 is processing for presentation, including the specific frame format of that media stream, the ACR server 208 could then work with the media client 200 to facilitate dynamic content modification at a particular time point in the media stream as discussed above, making use of the frame-format determination.

In a representative implementation, the ACR server 208 could first use the determined media stream identity as a basis to detect when a content-modification opportunity is about to occur in that particular media stream. And the ACR server 208 or other entity could then responsively cause the media client 200 to carry out a content modification at the time of that content-modification opportunity.

In line with the discussion above, this process could generally take advantage of a time delay that is likely to exist from the point in time when the media distribution system 204 outputs content of the media stream for transmission to the media client 200 to the point in time when the media client 200 receives and processes that content for presentation. This delay might be on the order of 5-10 seconds and may be a result of inherent communication-channel latency and/or intentional delaying of communication for this or other purposes.

Given this time delay, it may be possible for the media distribution system 204, the ACR server 208, and/or one or more other entities to detect the presence of particular content defining a content-modification opportunity in the media stream that is en route to (e.g., about to be or being distributed to) the media client 200 well enough before that content arrives at the media client 200. By engaging in quick (e.g., IP-based) communication with the media client 200 during that delay period, the ACR server 208 could then prepare the media client 200 to engage in content modification with respect to the detected content, so that when the detected content ultimately arrives at the media client 200 and/or is otherwise ready to be processed by the media client 200 for presentation, the media client 200 could carry out the content modification in a timely manner.

In an example implementation, the ACR server 208 could be provisioned in advance with modifiable-content segment data that includes digital fingerprints respectively representing each of various modifiable-content segments of media content, perhaps in different frame-format versions as well, along with associated metadata per modifiable-content segment, such as a duration of the segment, an identifier of the segment, a type of associated content modification (e.g., replacement or overlay) and the like. For instance, a content management system 218 could generate and provide this information in advance to the ACR server.

Having identified the media stream being processed for presentation by the media client 200, including the frame-format of the media stream, the ACR server 208 could then compare the ongoing sequence of reference fingerprints representing that identified media stream with the fingerprints representing the various modifiable-content segments. And upon finding with sufficient certainty that the reference fingerprints of the identified media stream match the fingerprints representing a particular modifiable-content segment, the ACR server 208 could reasonably conclude that the media stream that is en route to the media client 200 includes that modifiable-content segment. Further, the ACR server could thereby determine from the reference-fingerprint data 210 the reference timestamp indicating when the modifiable content segment is present in the media stream that is en route to the media client 200.

Upon so detecting the presence of a modifiable-content segment in the media stream that is en route to the media client 200, the ACR server 208 could then engage in signaling with the media client 200 to enable, cause, and prepare the media client 200 to perform a content modification with respect to that particular modifiable-content segment. For instance, the ACR server 208 could transmit to the media client 200 one or more messages defining content-modification directions that direct the media client 200 to carry out the content modification and provide information to facilitate the content modification.

In this process, the ACR server 208 could inform the media client 200 of timing of the upcoming content modification opportunity—such as the reference timestamp that the reference-fingerprint data 210 indicates for the reference fingerprint representing the first frame of the modifiable-content segment—so that the media client 200 can accordingly plan to carry out a content modification at the indicted action time point as the media client 200 processes the channel of content for presentation. Further, the ACR server 208 could inform the media client of the duration of the modifiable-content segment, an identifier of the modifiable-content segment, and a type of associated content modification (e.g., replacement or overlay) and the like, so that the media client can obtain appropriate replacement or overlay content to present.

For present purposes, the ACR server 208 could further inform the media client 200 of the frame format that the ACR server 208 determined is the frame format of the media stream being processed by the media client 200, so that the media client 200 can obtain and present replacement or overlay content specifically of that frame format. For instance, the ACR server 208 could inform the media client 200 that that is the frame format of the media stream at issue, so that the media client 200 would learn that any replacement or overlay content that the media client 200 obtains for presentation should be that same frame format. Or the ACR server 208 could more specifically inform the media client 200 that the replacement or overlay content that the media client 200 obtains for presentation should of that frame format.

For instance, if the ACR server 208 has determined that the media stream being processed by the media client 200 has the "normal" frame format, then the ACR server 208 could include in its content-modification directions to the media client 200 an indication that the frame format at issue is the "normal" frame format. Or if the ACR server 208 has determined that the media stream being processed by the media client 200 has the "wide" frame format, then the ACR server 208 could include in its content-modification directions to the media client 200 an indication that the frame format at issue is the "wide" frame format. And if the ACR server 208 has determined that the media stream being processed by the media client 200 has the "crop" frame format, then the ACR server 208 could include in its content-modification directions to the media client 200 an indication that the frame format at issue is the "crop" frame format.

With this information, the media client 200 could then responsively work with the content management system 218 and/or another entity to obtain details of the content modification to perform with respect to the upcoming modifiable-content segment, specifically as to the indicated frame-format version.

For instance, the media client 200 could transmit to the content management system 218 a request that provides the content management system 218 with the modifiable-content segment identifier and other associated metadata about the modifiable content segment, including the frame format indicated by the ACR server 208. And the content management system 218 could then use that information, including the specified frame format, as well as other information such as user demographics, location, or the like, as a basis to determine supplemental content that the media client 200 should insert in place of or as an overlay superimposed on the modifiable content segment. For example, based on the specified frame format, the content management system 218 could select supplemental content that has that specified frame format rather than selecting other supplemental content that has another frame format.

In addition, the content management system 218 could ascertain a storage location of determined supplemental content and could provide the media client 200 with an indication of that storage location. For instance, the content management system 218 could query a supplemental-content delivery system 220 to determine a URL or other address from which the content presentation 200 device could obtain the supplemental content from a network server or from local data storage of the media client 200. And the content management system 218 could provide the media client 200 with that address and/or with other information to enable the media client 200 to obtain the supplemental content. Alternatively, the content management system 218 itself or another entity could provide the media client 200 with the supplemental content.

With this information, the media client 200 could thus obtain the supplemental content and could process the supplemental content for presentation at the time of the modifiable-content segment in the media stream that the media client 200 is rendering. For instance, if the media client 200 is outputting ongoing content of the media stream to a display for presentation, the media client 200 could splice the supplemental content into the output in place of the modifiable-content segment and/or as an overlay on the modifiable-content segment, among other possibilities.

Optimally, this process could help ensure that when the media client 200 performs a dynamic content modification, the media client 200 will do so with the correct frame format of replacement or overlay content.

Namely, by determining the frame format of the media stream being processed by the media client 200 and informing the media client 200 of that frame format, the process could enable the media client 200 to obtain and apply the correct frame-format of replacement or overlay content. For instance, if the determined frame format is "normal", then the process could enable the media client 200 to obtain and apply "normal" frame-format replacement or overlay content. Whereas, if the determined frame format is "wide", then the process could enable the media client 200 to obtain and apply "wide" frame-format replacement or overlay content. And if the determined frame format is "crop", then the process could enable the media client 200 to obtain and apply "crop" frame-format replacement or overlay content.

In addition, as noted above, to help ensure that the media stream being processed for presentation by the media client 200 continues to be the identified media stream leading up to and during the dynamic content modification, or for other purposes, the ACR server 208 could provide the media client 200 with reference fingerprints to facilitate client-side fingerprint matching.

And here too, the ACR server 208 could make use the determined frame format of the media stream being processed for presentation by the media client 200. Namely, the ACR server 208 could use that determined frame format as a basis to provide the media client 200 with reference fingerprints specifically representing that particular frame-format version of the media stream.

In particular, while the ACR server 208 may have reference fingerprints representing video frames respectively of each of various different frame-format versions of the media stream that the media client 200 is processing for presentation, the ACR server 208 could use its determination of which of those frame-format versions the media client 200 is processing for presentation as a basis to determine which set of such reference fingerprints to provide to the media client 200 to facilitate client-side fingerprint matching.

This could involve providing the media client 200 with reference fingerprints representing a particular frame-format version of the media stream because of the determination that the media client 200 is processing that particular frame-format version of the media stream for presentation. Further, this could involve not providing the media client 200 with reference fingerprints representing one or more other frame-format versions of the media stream because of the determination that the media client 200 is processing the particular frame-format version of the media stream for presentation rather than processing the one or more other frame-format versions of the media stream for presentation.

For instance, if the ACR server 208 determines through fingerprint matching or otherwise that the media client 200 is presenting a media stream in the "normal" frame format, then the ACR server 208 could provide the media client 200 with reference fingerprints representing video frames of that "normal" frame format version of the media stream in particular. Whereas, if the ACR server 208 determines through fingerprint matching or otherwise that the media client 200 is presenting a media stream in the "wide" frame format, then the ACR server 208 could provide the media client 200 with reference fingerprints representing video frames of that "wide" frame format version of the media stream in particular. And if the ACR server 208 determines through fingerprint matching or otherwise that the media client 200 is presenting a media stream in the "crop" frame format, then the ACR server 208 could provide the media client 200 with reference fingerprints representing video frames of that "crop" frame format version of the media stream in particular. And in any of these cases, the media client 200 could then make use of the provided reference fingerprints to facilitate client-side fingerprint matching.

Note also that the client-side fingerprint matching facilitated through this process could be for various reasons, not limited to determining whether the media client 200 continues to present the identified media stream. Without limitation, another reason could be to facilitate establishing time synchronization or "synchronous lock" between time at the server and time according to a clock at the media client 200. Through client-side fingerprint matching, the media client 200 could find multiple match points each representing a match between one or more reference fingerprints and one or more query fingerprints. For each such match point, if the reference fingerprint(s) are timestamped with server time and the query fingerprint(s) are timestamped with client time, the media client 200 could then map the server time to the client time in order to determine a time offset, which the media client 200 and/or server might thereafter use to help ensure timely application of dynamic content modification. Other examples could be possible as well.

Figure 3:
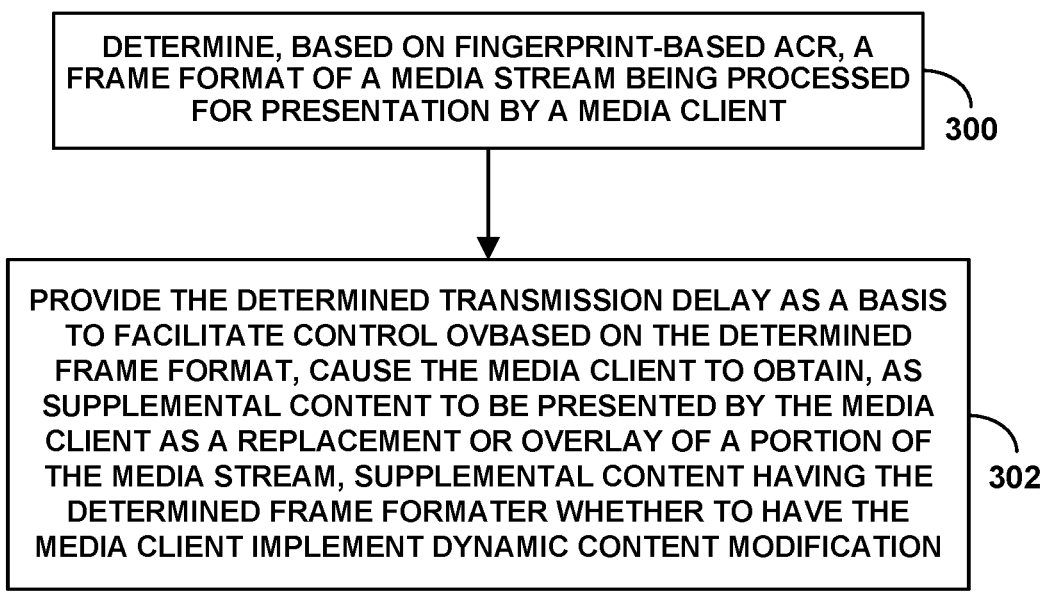
FIG. 3 is a flow chart depicting a method that could be carried out in accordance with the disclosure.

FIG. 3 is next a flow chart depicting an example method for use of frame format to control dynamic content modification of a media stream being processed for presentation by a media client, where the dynamic content modification includes the media client obtaining and presenting supplemental content as a replacement or overlay of a portion of the media stream. As shown in FIG. 3, at block 300, the method includes determining, based on fingerprint-based ACR, a frame format of the media stream being processed for presentation by the media client. And at block 302, the method includes, based on the determined frame format, causing the media client to obtain, as the supplemental content to be presented by the media client, supplemental content having the determined frame format.

In line with the discussion above, the frame format in this method could be a video frame format that defines an aspect ratio per video frame of the media stream.

Further, as discussed above, the act of determining based on fingerprint-based ACR, the frame format of the media stream being processed for presentation by the media client could involve comparing query fingerprints with reference fingerprints. In particular, the process could involve receiving, from the media client, query video fingerprint data representing the media stream being processed for presentation by the media client. Further, the process could involve comparing the received query video fingerprint data with reference video fingerprint data representing respectively each of multiple versions of the media stream, the multiple versions of the media stream having different frame formats than each other. And the process could involve, based on the comparing, determining that the query fingerprint data representing the media stream being processed for presentation by the media client matches the reference video fingerprint data representing a particular one of the multiple versions of the media stream, the particular version of the media stream having a particular frame format. The process could then involve, based on the determining that the query fingerprint data representing the media stream being processed for presentation by the media client matches the reference video fingerprint data representing the particular version of the media stream having the particular frame format, determining that the media stream being processed for presentation by the media client has the particular frame format.

As further discussed above, the act of determining, based on the comparing, that the query fingerprint data representing the media stream being processed for presentation by the media client matches the reference video fingerprint data representing the particular one of the multiple versions of the media stream could involve determining that, of the multiple versions of the media stream, the query video fingerprint data most closely matches the reference fingerprint data representing the particular version of the media stream.

Still further, the example method could involve identifying the media stream being processed for presentation by the media client. And the method could involve, based on the determined frame format, provisioning the media client with reference video fingerprints representing the identified media stream of the determined frame format, for use by the media client to conduct client-side fingerprint comparison to determine whether the media stream being processed by the media client continues to be the identified media stream.

Yet further, the act of provisioning the media client with the reference video fingerprints representing the identified media stream of the determined frame format could involve (i) selecting, from data that includes reference video fingerprints of the identified media stream of multiple frame formats, the reference video fingerprints of the identified media stream having determined frame format and (ii) providing the selected reference video fingerprints to the media client.

As additionally discussed above, the act of causing the media client to obtain, as the supplemental content to be presented by the media client, the supplemental content having the determined frame format could involve informing the media client of the determined frame format, the informing enabling to request and receive the supplemental content having the determined frame format.

Still further, as discussed above, this method could be carried out by a computing system in network communication with the media client. For instance, the method could be carried out by an ACR server. And as noted above, the method client could comprise a television, and the supplemental content comprises a replacement advertisement, with the dynamic content modification comprising dynamic ad insertion or the like.

Figure 4:
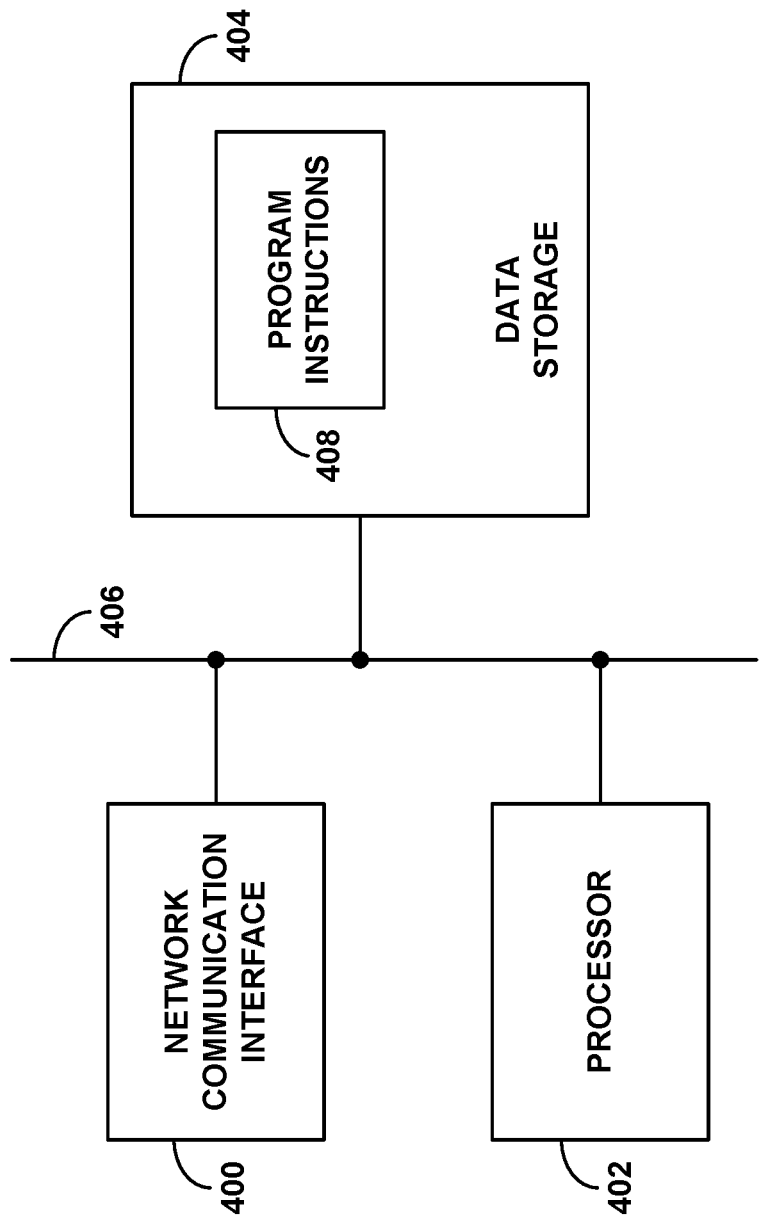
FIG. 4 is a simplified block diagram of an example system that could operate in accordance with the disclosure.

FIG. 4 is next a simplified block diagram of an example computing system operable in accordance with the present disclosure. This computing system could represent an ACR server, content distribution system, content presentation device, and/or one or more other entities or systems described above or otherwise applicable in the context discussed above. As shown in FIG. 4, the example computing system includes at least one network communication interface 400, at least one processor 402, and non-transitory data storage 404, any or all of which could be integrated together or, as shown, communicatively linked together by a system bus, network, or other connection mechanism 406.

The at least one network communication interface 400 could comprise one or more physical network connection mechanisms to facilitate communication on a network, and/or for engaging in direct or networked communication with one or more other local or remote entities. As such, the at least one network communication interface 400 could comprise a wireless or wired Ethernet interface, cellular wireless interface, or other type of network interface, for engaging in IP communication and/or other type of network communication.

The at least one processor 402 could comprise one or more general purpose processors (e.g., microprocessors) and/or one or more specialized processors (e.g., application specific integrated circuits). And the non-transitory data storage 404 could comprise one or more volatile and/or non-volatile storage components, such as optical, magnetic, or flash storage (necessarily non-transitory).

As shown, the data storage 404 of the example computing system could store program instructions 408, which could be executable by the at least one processor 402 to carry out various operations described herein.

Various features described above could be implemented in this context as well, and vice versa.

Figure 5:
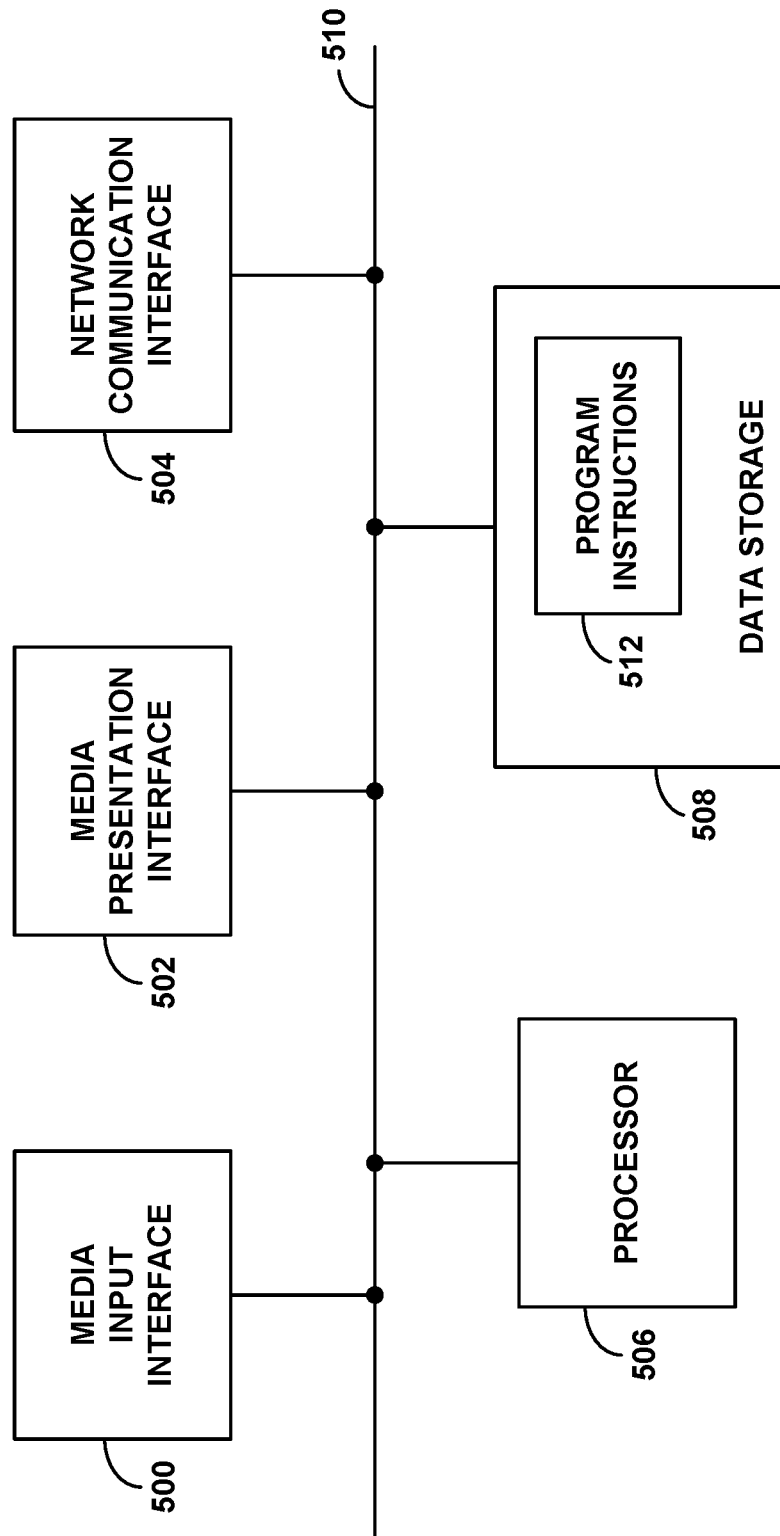
FIG. 5 is a simplified block diagram of an example media client that could operate in accordance with the disclosure.

Finally, FIG. 5 is a simplified block diagram of an example media client, such as a representative content presentation device, operable in accordance with the present disclosure. In line with the discussion above, this media client could take various forms. For instance, it could be a television, computer monitor, receiver, or other device that operates to receive and process media content for presentation, whether the media client will itself present the media content or will output the media content for presentation by another entity. Numerous other examples are possible as well.

As shown in FIG. 5, the example media client includes at least one media input interface 500, at least one media presentation interface 502, at least one network communication interface 504, at least one processor 506, and non-transitory data storage 508, any or all of which could be integrated together or, as shown, communicatively linked together by a system bus, network, or other connection mechanism 510.

The at least one media input interface 500 could comprise a physical communication interface for receiving media content to be processed for presentation. As such, the at least one media input interface could include one or more wired and/or wireless interfaces for establishing communication with and receiving media content in analog or digital form from a receiver or other device or system. For example, a media input interface could include one or more interfaces compliant with protocols such as DVI, HDMI, VGA, USB, BLUETOOTH, WIFI, Ethernet, among numerous others.

The at least one media presentation interface 502 could then comprise one or more components to facilitate presentation of the received media content if applicable. By way of example, the at least one media presentation interface 502 could comprise a user interface such as a display screen, as well as one or more drivers or other components for processing the received media content to facilitate presentation of the content on the user interface.

The at least one network communication interface 504 could comprise a physical network connection mechanism to facilitate communication on a network, and/or for engaging in direct or networked communication with one or more other local or remote entities. As such, the at least one network communication interface 504 could comprise a wireless or wired Ethernet interface or other type of network interface, for engaging in IP communication and/or other type of network communication.

The at least one processor 506 could then comprise one or more general purpose processors (e.g., microprocessors) and/or one or more specialized processors (e.g., application specific integrated circuits). And the non-transitory data storage 508 could comprise one or more volatile and/or non-volatile storage components, such as optical, magnetic, or flash storage. Further, as shown, data storage 508 could store program instructions 512, which could be executable by processing unit 506 to carry out various media-client operations described herein.

Various features described above could be implemented in this context as well, and vice versa.

Further, the present disclosure also contemplates a non-transitory computer readable medium that is encoded with, stores, or otherwise embodies program instructions executable by a processing unit to carry out various operations as described above.

Exemplary embodiments have been described above. Those skilled in the art will understand, however, that changes and modifications may be made to these embodiments without departing from the true scope and spirit of the invention.

What is claimed is:

1. A method for use of frame format to control dynamic content modification of a media stream being processed for presentation by a media client, comprising:
   identifying a fingerprint corresponding to the media stream;
   determining, based on the fingerprint, a frame format of the media stream being processed for presentation by the media client;
   identifying, in the media stream, a segment fingerprint representing a modifiable content segment of content;
   identifying a timestamp corresponding to the segment fingerprint;
   providing the timestamp to the media client;
   identifying, based on the determined frame format, supplemental content to be presented by the media client at the timestamp, the supplemental content having the determined frame format; and
   providing, to the media client, one of: the supplemental content or an address where the supplemental content is stored, wherein the media client is configured to output the supplemental content at the timestamp.

2. The method of claim 1, wherein the frame format is a video frame format that defines an aspect ratio per video frame of the media stream.

3. The method of claim 1, further comprising:
   identifying the media stream being processed for presentation by the media client; and
   based on the determined frame format, provisioning the media client with reference video fingerprints representing the identified media stream of the determined frame format, for use by the media client to conduct a client-side fingerprint comparison to determine whether the media stream being processed by the media client continues to be the identified media stream.

4. The method of claim 1, wherein identifying the supplemental content to be presented by the media client comprises:
   informing the media client of the determined frame format,
   wherein the informing the media client of the determined frame format enables the media client to request and receive the supplemental content having the determined frame format.

5. The method of claim 1, wherein the method is carried out by a computing system in network communication with the media client.

6. The method of claim 1, wherein the media client comprises a television.

7. The method of claim 1, wherein the supplemental content comprises a replacement advertisement.

8. The method of claim 1, wherein the supplemental content comprises an overlay superimposed on the modifiable content segment.

9. The method of claim 2, wherein determining, based on the fingerprint, the frame format of the media stream being processed for presentation by the media client comprises:
   receiving, from the media client, query video fingerprint data representing the media stream being processed for presentation by the media client;
   comparing the received query video fingerprint data with reference video fingerprint data representing respectively each of multiple versions of the media stream, the multiple versions of the media stream having different frame formats than each other;
   based on the comparing, determining that the query fingerprint data representing the media stream being processed for presentation by the media client matches the reference video fingerprint data representing a particular version of the multiple versions of the media stream, the particular version of the media stream having a particular frame format; and
   based on the determining that the query fingerprint data representing the media stream being processed for presentation by the media client matches the reference video fingerprint data representing the particular version of the media stream having the particular frame format, determining that the media stream being processed for presentation by the media client has the particular frame format.

10. The method of claim 9, wherein determining, based on the comparing, that the query fingerprint data representing the media stream being processed for presentation by the media client matches the reference video fingerprint data representing the particular version of the multiple version of the media stream comprises:
    determining that, of the multiple versions of the media stream, the query video fingerprint data most closely matches the reference fingerprint data representing the particular version of the media stream.

11. The method of claim 3, wherein provisioning the media client with the reference video fingerprints representing the identified media stream of the determined frame format comprises:

selecting, from data that includes reference video fingerprints of the identified media stream of multiple frame formats, the reference video fingerprints of the identified media stream having the determined frame format; and providing the selected reference video fingerprints to the media client.

12. The method of claim 8, further comprising:
providing, to the media client, a duration of the overlay.

13. A computing system comprising:
at least one network communication interface;
at least one processor;
non-transitory data storage; and
program instructions stored in the non-transitory data storage and executable by the at least one processor to carry out operations for using frame format to control dynamic content modification of a media stream being processed for presentation by a media client, the operations including:
identifying a fingerprint corresponding to the media stream;
determining, based on the fingerprint, a frame format of the media stream being processed for presentation by the media client;
identifying, in the media stream, a segment fingerprint representing a modifiable content segment of content;
identifying a timestamp corresponding to the segment fingerprint;
providing the timestamp to the media client;
identifying, based on the determined frame format, supplemental content to be presented by the media client at the timestamp, the supplemental content having the determined frame format; and
providing, to the media client, one of: the supplemental content or an address where the supplemental content is stored, wherein the media client is configured to output the supplemental content at the timestamp.

14. The computing system of claim 13, wherein the frame format is a video frame format that defines an aspect ratio per video frame of the media stream.

15. The computing system of claim 13, wherein the operations additionally include:
identifying the media stream being processed for presentation by the media client; and
based on the determined frame format, provisioning the media client with reference video fingerprints representing the identified media stream of the determined frame format, for use by the media client to conduct a client-side fingerprint comparison to determine whether the media stream being processed by the media client continues to be the identified media stream.

16. The computing system of claim 13, wherein identifying the supplemental content to be presented by the media client comprises:
informing the media client of the determined frame format,
wherein the informing the media client of the determined frame format enables the media client to request and receive the supplemental content having the determined frame format.

17. The computing system of claim 14, wherein determining, based on the fingerprint, the frame format of the media stream being processed for presentation by the media client comprises:

receiving, through the at least one network communication interface, from the media client, query video fingerprint data representing the media stream being processed for presentation by the media client;

comparing the received query video fingerprint data with reference video fingerprint data representing respectively each of multiple versions of the media stream, the multiple versions of the media stream having different frame formats than each other;

based on the comparing, determining that the query fingerprint data representing the media stream being processed for presentation by the media client matches the reference video fingerprint data representing a particular version of the multiple versions of the media stream, the particular version of the media stream having a particular frame format; and based on the determining that the query fingerprint data representing the media stream being processed for presentation by the media client matches the reference video fingerprint data representing the particular version of the media stream having the particular frame format, determining that the media stream being processed for presentation by the media client has the particular frame format.

18. The computing system of claim 17, wherein determining, based on the comparing, that the query fingerprint data representing the media stream being processed for presentation by the media client matches the reference video fingerprint data representing the particular version of the multiple versions of the media stream comprises:
determining that, of the multiple versions of the media stream, the query video fingerprint data most closely matches the reference fingerprint data representing the particular version of the media stream.

19. The computing system of claim 15, wherein provisioning the media client with the reference video fingerprints representing the identified media stream of the determined frame format comprises:

selecting, from data that includes reference video fingerprints of the identified media stream of multiple frame formats, the reference video fingerprints of the identified media stream having the determined frame format; and transmitting the selected reference video fingerprints, through the at least one network communication interface, to the media client.

20. A non-transitory computer-readable medium embodying program instructions executable by at least one processor to carry out operations for controlling dynamic content modification of a media stream being processed for presentation by a media client, the operations including:
identifying a fingerprint corresponding to the media stream;
determining, based on the fingerprint, a frame format of the media stream being processed for presentation by the media client;
identifying, in the media stream, a segment fingerprint representing a modifiable content segment of content;
identifying a timestamp corresponding to the segment fingerprint;
providing the timestamp to the media client;
identifying, based on the determined frame format, supplemental content to be presented by the media client at the timestamp, supplemental content having the determined frame format; and providing, to the media client, one of: the supplemental content or an address where the supplemental content is stored, wherein the media client is configured to output the supplemental content at the timestamp.

21. The non-transitory computer-readable medium of claim 20, wherein determining, based on the fingerprint, the frame format of the media stream being processed for presentation by the media client comprises:

receiving, from the media client, query video fingerprint data representing the media stream being processed for presentation by the media client;

comparing the received query video fingerprint data with reference video fingerprint data representing respectively each of multiple versions of the media stream, the multiple versions of the media stream having different frame formats than each other;

based on the comparing, determining that the query fingerprint data representing the media stream being processed for presentation by the media client matches the reference video fingerprint data representing a particular version of the multiple versions of the media stream, the particular version of the media stream having a particular frame format; and based on the determining that the query fingerprint data representing the media stream being processed for presentation by the media client matches the reference video fingerprint data representing the particular version of the media stream having the particular frame format, determining that the media stream being processed for presentation by the media client has the particular frame format.

22. The non-transitory computer-readable medium of claim 20, wherein the operations additionally include:

identifying the media stream being processed for presentation by the media client; and based on the determined frame format, provisioning the media client with reference video fingerprints representing the identified media stream of the determined frame format, for use by the media client to conduct a client-side fingerprint comparison to determine whether the media stream being processed by the media client continues to be the identified media stream.

\* \* \* \* \*

UNITED STATES PATENT AND TRADEMARK OFFICE
CERTIFICATE OF CORRECTION

| | |
|---|---|
| PATENT NO. | : 11,641,495 B2 |
| APPLICATION NO. | : 17/208283 |
| DATED | : May 2, 2023 |
| INVENTOR(S) | : Seo et al. |

It is certified that error appears in the above-identified patent and that said Letters Patent is hereby corrected as shown below:

In the Claims

In Column 18, Claim 10, Line 62, delete "version" and insert -- versions --, therefor.

Signed and Sealed this
Eighteenth Day of July, 2023

Katherine Kelly Vidal
*Director of the United States Patent and Trademark Office*